(12) United States Patent
Kim et al.

(10) Patent No.: US 12,438,232 B2
(45) Date of Patent: Oct. 7, 2025

(54) BINDER RESIN COMPOSITION AND SEPARATOR FOR ELECTROCHEMICAL DEVICE COMPRISING THE SAME

(71) Applicant: LG ENERGY SOLUTION, LTD., Seoul (KR)

(72) Inventors: Myeong-Soo Kim, Daejeon (KR); Su-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 783 days.

(21) Appl. No.: 17/609,617

(22) PCT Filed: Apr. 29, 2020

(86) PCT No.: PCT/KR2020/005786
§ 371 (c)(1),
(2) Date: Nov. 8, 2021

(87) PCT Pub. No.: WO2020/226367
PCT Pub. Date: Nov. 12, 2020

(65) Prior Publication Data
US 2022/0220294 A1    Jul. 14, 2022

(30) Foreign Application Priority Data
May 9, 2019 (KR) .................. 10-2019-0054534

(51) Int. Cl.
*H01M 50/42* (2021.01)
*C08L 27/16* (2006.01)
(Continued)

(52) U.S. Cl.
CPC ........... *H01M 50/426* (2021.01); *C08L 27/16* (2013.01); *C08L 31/04* (2013.01); *C08L 39/06* (2013.01);
(Continued)

(58) Field of Classification Search
None
See application file for complete search history.

(56) References Cited

U.S. PATENT DOCUMENTS

2005/0014063 A1    1/2005   Shi et al.
2010/0233523 A1    9/2010   Jo et al.
(Continued)

FOREIGN PATENT DOCUMENTS

CN    103155258 A    6/2013
CN    103477491 A    12/2013
(Continued)

OTHER PUBLICATIONS

Extended European Search Report dated May 6, 2022 corresponding for EP Application No. 20802675.7.
(Continued)

*Primary Examiner* — Jonathan G Leong
*Assistant Examiner* — Tony S Chuo
(74) *Attorney, Agent, or Firm* — Birch, Stewart, Kolasch & Birch, LLP

(57) ABSTRACT

A binder resin composition comprising polyvinyl pyrrolidone-polyvinyl acetate block copolymer (PVP-co-PVAc). When introducing the binder resin composition to the porous coating layer of a separator for an electrochemical device, there an effect of significantly improving binding characteristics and heat resistance/safety.

4 Claims, 1 Drawing Sheet

(51) Int. Cl.
*C08L 31/04* (2006.01)
*C08L 39/06* (2006.01)
*H01M 50/426* (2021.01)
*H01M 50/443* (2021.01)
*H01M 50/449* (2021.01)
*H01M 50/489* (2021.01)
*H01M 50/491* (2021.01)

(52) U.S. Cl.
CPC ....... *H01M 50/443* (2021.01); *H01M 50/449* (2021.01); *H01M 50/489* (2021.01); *H01M 50/491* (2021.01)

(56) References Cited

U.S. PATENT DOCUMENTS

| | | |
|---|---|---|
| 2012/0251869 A1 | 10/2012 | Lee et al. |
| 2014/0050965 A1 | 2/2014 | Ha et al. |
| 2014/0272565 A1 | 9/2014 | Gronwald et al. |
| 2015/0140404 A1 | 5/2015 | Yoo et al. |
| 2015/0162588 A1 | 6/2015 | Lee et al. |
| 2016/0204409 A1* | 7/2016 | Jeon .................... H01M 50/489 429/145 |
| 2017/0093001 A1 | 3/2017 | Kim et al. |
| 2018/0254447 A1 | 9/2018 | Lee et al. |
| 2018/0342756 A1 | 11/2018 | Song et al. |
| 2019/0245183 A1 | 8/2019 | Jeong et al. |
| 2020/0203690 A1 | 6/2020 | Kwon et al. |
| 2020/0335759 A1 | 10/2020 | Lane et al. |
| 2021/0083253 A1 | 3/2021 | Jeon |

FOREIGN PATENT DOCUMENTS

| | | |
|---|---|---|
| EP | 1 096 591 A1 | 5/2001 |
| JP | 2001-155770 A | 6/2001 |
| JP | 2018-37351 A | 3/2018 |
| KR | 10-2003-0007634 A | 1/2003 |
| KR | 10-2003-0019385 A | 3/2003 |
| KR | 10-2005-0008490 A | 1/2005 |
| KR | 10-2008-0013208 A | 2/2008 |
| KR | 10-1341198-81 | 12/2013 |
| KR | 10-2015-0032280 A | 3/2015 |
| KR | 10-2015-0132427 A | 11/2015 |
| KR | 10-2016-0076363 A | 6/2016 |
| KR | 10-2016-0079271 A | 7/2016 |
| KR | 10-2016-0079290 A | 7/2016 |
| KR | 10-2017-0037533 A | 4/2017 |
| KR | 10-2017-0097210 A | 8/2017 |
| KR | 10-2018-0093831 A | 8/2018 |
| KR | 10-2018-0128322 A | 12/2018 |
| KR | 10-2019-0022917 A | 3/2019 |
| KR | 10-2019-0044529 A | 4/2019 |
| WO | WO 2018-003373 A1 | 1/2018 |
| WO | WO 2018/182028 A1 | 10/2018 |

OTHER PUBLICATIONS

International Search Report (PCT/ISA/210) issued in PCT/KR2020/005786 mailed on Aug. 21, 2020.

* cited by examiner

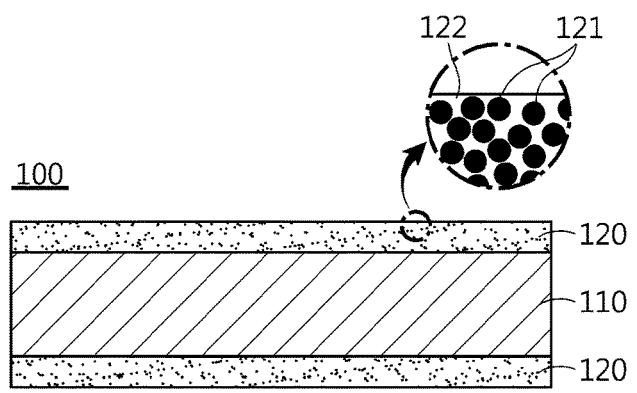

BINDER RESIN COMPOSITION AND SEPARATOR FOR ELECTROCHEMICAL DEVICE COMPRISING THE SAME

TECHNICAL FIELD

The present application claims priority to Korean Patent Application No. 10-2019-0054534 filed on May 9, 2019 in the Republic of Korea. The present disclosure relates to a binder resin composition for an electrochemical device.

BACKGROUND ART

Recently, electrochemical devices have received increasing attention with reference to ensuring their safety. Particularly, a secondary battery, such as a lithium secondary battery, has an electrode assembly comprising a positive electrode, a negative electrode and a separator. Such an electrode assembly may be manufactured to have a structure in which the separator is interposed between the positive electrode and the negative electrode.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, comprising orientation, thereby causing a short-circuit between a positive electrode and a negative electrode.

To solve the above-mentioned safety problem of an electrochemical device, there has been suggested a separator comprising a porous coating layer formed by coating a mixture of an excessive amount of inorganic particles with a binder resin on at least one surface of a porous substrate having a plurality of pores. Since the inorganic particles contained in the porous coating layer have high heat resistance, it is possible to maintain electrical insulation between a positive electrode and a negative electrode, even when an electrochemical device is overheated, thereby preventing a short-circuit.

In general, a PVDF-based polymeric material has been used as a binder resin used for such a porous coating layer, considering binding of the inorganic particles among themselves and interlayer adhesion between an electrode and a separator. However, the PVDF-based polymeric material is disadvantageous in that it shows insufficient heat resistance and safety and causes degradation of binding force in an electrolyte. Considering this, there has been suggested a method of mixing polyvinyl pyrrolidone (PVP) with a PVDF-based polymeric material. Such mixing with PVP provides an effect of improving heat resistance, but causes further degradation of binding force. Thus, there has been a need for developing a binder resin composition effective for improvement of binding force and heat resistance/safety.

DISCLOSURE

Technical Problem

The present disclosure is directed to providing a binder resin composition having improved heat resistance/safety and binding force, and a separator for an electrochemical device comprising the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art. According to the first embodiment of the present disclosure, there is provided a binder resin composition for an electrochemical device, comprising a polyvinylidene fluoride (PVDF)-based polymer, polyvinyl pyrrolidone (PVP) and polyvinyl pyrrolidone-polyvinyl acetate block copolymer (PVP-co-PVAc), wherein the content of PVP-co-PVAc is 3 wt % to 14 wt % based on 100 wt % of the binder resin composition, PVP-co-PVAc has a molecular weight (Mw) of 500,000 g/mol or more, and the content of PVAc polymerization units in PVP-co-PVAc is 30 wt % to 85 wt %.

According to the second embodiment of the present disclosure, there is provided the binder resin composition for an electrochemical device as defined in the first embodiment, wherein PVP-co-PVAC has a molecular weight (Mw) of 800,000 g/mol or more.

According to the third embodiment of the present disclosure, there is provided the binder resin composition for an electrochemical device as defined in the first or the second embodiment, wherein the content of PVP-co-PVAc is 5 wt % to 10 wt % based on 100 wt % of the binder resin composition.

According to the fourth embodiment of the present disclosure, there is provided the binder resin composition for an electrochemical device as defined in any one of the first to the third embodiments, wherein the content of PVAc polymerization units in PVP-co-PVAc is 50 wt % to 80 wt %.

According to the fifth embodiment of the present disclosure, there is provided the binder resin composition for an electrochemical device as defined in any one of the first to the fourth embodiments, wherein the PVDF-based polymer is present in an amount of 1_wt % to 50 wt % based on 100 wt % of the binder composition.

According to the sixth embodiment of the present disclosure, there is provided the binder resin composition for an electrochemical device as defined in any one of the first to the fifth embodiments, wherein the PVDF-based polymer comprises vinylidene fluoride homopolymer (PVDF), poly(vinylidene fluoride)-co-hexafluoropropylene (PVDF-HFP) or poly(vinylidene fluoride-co-chlorotrifluoroethylene) (PVDF-CTFE).

According to the seventh embodiment of the present disclosure, there is provided a separator for an electrochemical device, comprising: a porous polymer substrate; and a porous coating layer formed on at least one surface of the porous polymer substrate, wherein the porous coating layer comprises inorganic particles and a binder resin composition, and the binder resin composition is the binder resin composition for the electrochemical device as defined in any one of the first to the sixth embodiments.

According to the eighth embodiment of the present disclosure, there is provided the separator for an electrochemical device as defined in the seventh embodiment, wherein the inorganic particles comprise $BaTiO_3$, $Pb(Zr,Ti)O_3$ (PZT), $b_{1-x}La_xZr_{1-y}Ti_yO_3$ (PLZT, $0<x<1$, $0<y<1$), $Pb(Mg_{1/3}Nb_{2/3})O_3$—$PbTiO_3$(PMN-PT), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$, or two or more of them.

According to the ninth embodiment of the present disclosure, there is provided the separator for an electrochemical device as defined in the seventh or the eighth embodiment, wherein the binder resin composition is present in an amount of 0.1 wt % to 80 wt % based on 100 wt % of the combined weight of the binder resin composition with the inorganic particles in the porous coating layer.

According to the tenth embodiment of the present disclosure, there is provided an electrochemical device comprising a positive electrode, a negative electrode and a separator interposed between the positive electrode and the negative electrode, wherein the separator is the separator for the electrochemical device as defined in any one of the seventh to the ninth embodiments.

Advantageous Effects

The binder resin composition according to the present disclosure comprises polyvinyl pyrrolidone-polyvinyl acetate block copolymer (PVP-co-PVAc). When the binder resin composition is introduced to the porous coating layer of a separator, it is possible to improve binding characteristics and heat resistance/safety significantly. Since the separator to which the binder resin composition is introduced has improved binding force to an electrode, it is possible to improve resistance characteristics and output characteristics. In addition, it is possible to prevent separation of inorganic particles from a separator, thereby providing an effect of improving the durability of the separator. Further, since the separator has improved heat resistance/safety, the short-circuit generation point is delayed significantly. When a battery is manufactured by using the binder resin composition, the battery has significantly improved cycle characteristics by virtue of the above-mentioned effects.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

The FIGURE is a schematic sectional view of the separator according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈comprises⌋ an element' does not preclude the presence of any additional elements but means that the part may further comprise the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure comprising an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms comprise the above-listed words, derivatives thereof and words having similar meanings.

The present disclosure relates to a binder resin composition for an electrochemical device. For example, the binder resin composition may be used as a binder ingredient of a separator for an electrochemical device. According to an embodiment of the present disclosure, the electrochemical device means a device converting chemical energy into electrical energy by electrochemical reactions, and has a concept covering a primary battery and a secondary battery. In addition, the secondary battery is a rechargeable battery, and has a concept covering a lithium ion battery, nickel-cadmium battery, nickel-metal hydride battery, or the like. According to an embodiment of the present disclosure, the separator for an electrochemical devices functions as an insulation film which electrically insulates electrodes having opposite polarities to each other in an electrochemical device. For example, the separator is a structural element of a unit cell comprising a positive electrode, a negative electrode and a separator. According to an embodiment of the present disclosure, the separator may comprise the binder resin composition according to the present disclosure. In a variant, the separator may comprise inorganic particles in combination with the binder resin composition.

Hereinafter, the binder resin composition will be explained in more detail.

The binder resin composition comprises a PVDF-based polymer, polyvinyl pyrrolidone (PVP) and polyvinyl pyrrolidone-polyvinyl acetate block copolymer (PVP-co-PVAc).

PVDF-Based Polymer

According to an embodiment of the present disclosure, the PVDF-based polymer may be present in an amount of 1-50 wt % based on 100 wt % of the binder resin composition. Considering the adhesion and formation of pores in a porous coating layer, the PVDF-based polymer may be present in an amount of 5-20 wt % based on 100 wt % of the binder resin composition. As described hereinafter, the binder resin composition may be used as a binder resin ingredient of a porous coating layer, and the porous coating layer may have pores formed by inducing phase separation of the PVDF-based polymer, while slurry for forming a porous coating layer is solidified under a humidified condition. Herein, when the content of the PVDF-based polymer is excessively low in the binder resin composition, the ingredient capable of undergoing phase separation is insufficient so that pores may not be formed with a desired level in terms of pore size and porosity.

According to an embodiment of the present disclosure, the PVDF-based polymer may be vinylidene fluoride homopolymer (i.e. polyvinylidene fluoride), copolymer of vinylidene fluoride with a copolymerizable monomer, or a mixture thereof. According to an embodiment, particular examples of the monomer comprise fluorinated monomers and/or chlorinated monomers. Non-limiting examples of the fluorinated monomers comprise at least one selected from: vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl) ether, such as perfluoro(methylvinyl)ether (PMVE). Perfluoro(ethylvinyl)ether (PEVE) or pefluoro(propylvinyl)ether (PPVE); perfluoro(1,3-dioxole); perfluoro(2,2-dimethyl-1,3-dioxol) (PDD); or the like. For example, the PVDF-based polymer may comprise vinylidene fluoride homopolymer, PVDF-HFP, PVDF-CTFE, or two or more of them.

Polyvinyl Pyrrolidone

According to an embodiment of the present disclosure, polyvinyl pyrrolidone may be represented by the following Chemical Formula 1, and may be present in an amount of 1-20 wt % based on 100 wt % of the binder resin composition. Considering the heat resistance and formation of pores in a porous coating layer, polyvinyl pyrrolidone may be present in an amount of 5-10 wt % based on 100 wt % of the binder resin composition. When polyvinyl pyrrolidone is present in an excessively larger amount more than 20 wt % in the binder resin composition, it interrupts phase separation of the PVDF-based polymer in the subsequent step so that pores may not be formed sufficiently, resulting in a decrease in porosity of a separator.

[Chemical Formula 1]

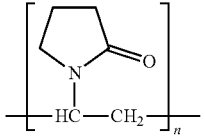

Meanwhile, according to an embodiment of the present disclosure, polyvinyl pyrrolidone used herein may have a molecular weight (Mw) of 500,000 g/mol or more with a view to ensuring heat resistance, but is not limited thereto.

According to the present disclosure, the term 'molecular weight' refers to weight average molecular weight (Mw). According to an embodiment of the present disclosure, the molecular weight (Mw) may be determined by using gel permeation chromatography (GPC). For example, 200 mg of a compound whose molecular weight is to be determined is diluted in 200 mL of a solvent, such as tetrahydrofuran (THF), to prepare about 1000 ppm of sample, and then the molecular weight may be determined by using Agilent 1200 series GPC instrument at a flow rate of 1 mL/min through a refractive index (RI) detector.

Polyvinyl Pyrrolidone-Polyvinyl Acetate Block Copolymer (PVP-co-PVAc)

According to an embodiment of the present disclosure, PVP-co-PVAc may be a block copolymer comprising vinyl pyrrolidone repeating units copolymerized with vinyl acetate repeating units. According to a particular embodiment, PVP-co-PVAc may comprise a compound represented by the following Chemical Formula 2. PVP-co-PVAc may be present in an amount of 3-14 wt % based on 100 wt % of the binder resin composition. Considering the heat resistance and formation of pores in a porous coating layer, PVP-co-PVAc may be present in an amount of 5 wt-10 wt % based on 100 wt % of the binder resin composition.

[Chemical Formula 2]

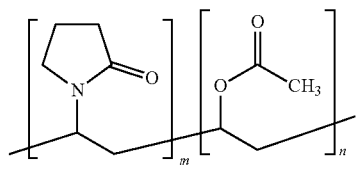

According to an embodiment of the present disclosure, PVP-co-PVAc has a molecular weight (Mw) of 500,000 g/mol or more. When PVP-co-PVAC has a molecular weight less than the above-defined range, the binder resin composition shows an insufficient effect of improving adhesion. According to an embodiment, the molecular weight may be controlled to 500,000-5,000,000, but the upper limit of the molecular weight is not particularly limited.

In addition, according to an embodiment of the present disclosure, PVAc may be present in an amount of 30-85 wt % in PVP-co-PVAc. For example, considering the effect of improving adhesion and heat resistance, PVAc may be present preferably in an amount of 20-80 wt % in PVP-co-PVAc.

Meanwhile, the content (wt %) of each repeating unit in the block copolymer may be analyzed by using $^1$H-NMR or $^{13}$C-NMR. Such analysis may be carried out by using Varian 500, but is not limited thereto.

Hereinafter, a separator for an electrochemical device comprising the binder resin composition will be explained.

According to an embodiment of the present disclosure, the separator may be a porous membrane comprising the above-described binder resin composition and inorganic particles. According to another embodiment of the present disclosure, the separator may comprise a porous substrate and a porous coating layer disposed on at least one surface of the porous substrate, wherein the porous coating layer may comprise a mixture of inorganic particles with the binder resin composition according to the present disclosure.

FIG. 1 is a schematic sectional view illustrating the separator 100 according to an embodiment of the present disclosure. The separator 100 comprises porous coating layers 120 formed on both surfaces of a porous substrate 110. The porous coating layer comprises inorganic particles 121 and the binder resin composition 122 according to the present disclosure. Hereinafter, the separator comprising the porous coating layer according to the present disclosure will be explained in more detail.

The porous substrate means a porous ion-conducting barrier which allows ions to pass therethrough, while interrupting an electrical contact between a negative electrode and a positive electrode, and has a plurality of pores formed therein. The pores are interconnected so that gases or liquids may pass from one surface of the substrate to the other surface of the substrate. Materials forming the porous substrate may be any organic materials or inorganic materials having electrical insulation property. Particularly, with a view to imparting a shut-down function to the substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may comprise at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous substrate may comprise a non-woven web, a porous polymer film, or a laminate of two or more layers thereof, but is not limited thereto.

Particularly, the porous polymer substrate may be any one of the following a) to e):

a) A porous film formed by melting and extruding a polymer resin;
b) A multilayer film formed by stacking two or more layers of the porous films of a);
c) A non-woven web formed by integrating filaments obtained by melting/spinning a polymer resin;
d) A multilayer film formed by stacking two or more layers of the non-woven webs of c); and
e) A porous composite film having a multilayer structure comprising two or more of a) to d).

According to the present disclosure, the porous substrate preferably has a thickness of 3-12 μm, or 5-12 μm. When the thickness is smaller than the above-defined range, it is not possible to obtain a sufficient conducting barrier function. On the other hand, when the thickness is excessively larger than the above-defined range (i.e. the porous substrate is excessively thick), the separator may show excessively increased resistance.

According to an embodiment of the present disclosure, polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous substrate may have a puncture strength of 300 gf or more in terms of improvement of production yield.

The puncture strength of a porous substrate refers to the highest puncture load (go measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 10-100 nm and a thickness of 5-12 μm may be used.

According to the present disclosure, the porous coating layer may be formed on at least one surface of the porous substrate, and comprises inorganic particles and the binder resin composition according to the present disclosure.

The inorganic particles are closely packed in the porous coating layer and the porous coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder resin composition and are bound to one another in a face-to-face or dot-to-dot manner by means of the binder resin composition. According to an embodiment of the present disclosure, the porous coating layer may comprise the binder resin composition and the inorganic particles at a weight ratio of 0.1:99.9-80:20. In other words, the porous coating layer may comprise the binder resin composition in an amount of 0.1-80 wt % based on 100 wt % of the combined weight of the binder resin composition with the inorganic particles. According to an embodiment of the present disclosure, with a view to adhesion and heat resistance, the binder resin composition may be present in an amount of about 10-30 wt %.

According to an embodiment of the present disclosure, the porous coating layer may have an average pore size of 20-1,000 nm. Within the above-defined range, the porous coating layer may have an average pore size of 800 nm or less, or 500 nm or less. Independently from this, or in combination with this, the porous coating layer may have an average pore size of 20 nm or more, 50 nm or more, or 100 nm or more. The pore size may be calculated from image analysis through scanning electron microscopic (SEM) images. When the pore size is smaller than the above-defined range, the pores may be blocked with ease due to the swelling of the binder resin composition in the porous coating layer. When the pore size exceeds the above-defined range, the resultant separator hardly functions as an insulating film and a secondary battery using the separator shows a problem of degradation of self-discharge characteristics.

According to an embodiment of the present disclosure, the porous coating layer preferably has a porosity of 30-80%. A porosity of 30% or more is advantageous to lithium ion permeability, while a porosity of 80% or less is suitable for ensuring adhesion between a separator and an electrode, since the surface opening ratio is not excessively high in this case.

In addition, according to an embodiment of the present disclosure, the separator has an air permeability of 1500 s/100 cc or less.

Meanwhile, according to the present disclosure, porosity and pore size may be determined by using BELSORP (BET system) available from BEL JAPAN Co. with an adsorption gas, such as nitrogen, or by using mercury intrusion porosimetry, capillary flow porosimetery, or the like. According to an embodiment of the present disclosure, the porosity of the porous coating layer may be calculated from the thickness and weight of the resultant coating layer and the theoretical density of the coating layer.

As used herein, the term 'permeability' means the time required for 100 cc or air to permeate through a separator, is expressed in the unit of second/100 cc in the present disclosure, may be used exchangeably with 'transmission', and is generally represented by Gurley value, or the like.

The porous coating layer preferably has a thickness of 1.5-5.0 μm on one surface of the porous substrate. Preferably, the thickness may be 1.5 μm or more. Within the above-defined range, it is possible to provide excellent adhesion to an electrode, and thus to increase the cell strength of a battery. Meanwhile, when the thickness is 5.0 μm or less, it is possible to provide advantageous effects in terms of cycle characteristics and resistance characteristics of a battery.

According to an embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may comprise $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium ion transportability, i.e. inorganic particles which contain lithium elements and do not store lithium but transport lithium ions. Non-limiting examples of the inorganic particles having lithium ion transportability comprise lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

Hereinafter, the method for manufacturing the separator according to the present disclosure will be explained. The separator may be obtained by applying slurry for forming a porous coating layer comprising the binder resin composition according to the present disclosure and inorganic particles onto a porous substrate, and solidifying the slurry so that a porous coating layer may be formed integrally on the porous substrate.

Particularly, the binder resin composition is dissolved in a solvent to prepare a polymer solution, and inorganic particles are introduced to and mixed with the polymer solution to prepare slurry for forming an inorganic coating layer. Then, the slurry is applied onto a porous substrate and allowed to stand under a relative humidity of about 30-70% for a predetermined time to solidify the binder resin composition. The term 'solidify' means that the slurry is dried, while the solvent is removed. Herein, phase separation of the PVDF-based polymer in the binder resin composition is induced. During the phase separation, the solvent moves toward the surface portion of the porous coating layer and the PVDF-based polymer also moves toward the surface portion of the porous coating layer along with the movement of the solvent. In this manner, the surface portion of the porous coating layer has a higher content of the PVDF-based polymer. The portion under the surface portion of the porous coating layer is provided with porous property, while pores are formed due to the interstitial volumes among the inorganic particles.

For example, the slurry may comprise a solvent selected suitable from acetone, methyl ethyl ketone, N-methyl pyrrolidone, polar amide solvents, such as dimethyl acetamide, diethyl formamide, diethyl formamide, or the like.

According to an embodiment of the present disclosure, the slurry may be applied by using a conventional coating process, such as Mayer bar coating, die coating, reverse roll coating, gravure coating, or the like.

Meanwhile, the present disclosure provides a secondary battery comprising the separator. The battery comprises a negative electrode, a positive electrode and a separator interposed between the negative electrode and the positive electrode, wherein the separator comprises the binder resin composition according to the present disclosure.

According to the present disclosure, the positive electrode comprises a positive electrode current collector and a positive electrode active material layer formed on at least one surface of the current collector and containing a positive electrode active material, a conductive material and a binder resin. The positive electrode active material may comprise any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode comprises a negative electrode current collector, and a negative electrode active material layer formed on at least one surface of the current collector and containing a negative electrode active material, a conductive material and a binder resin. The negative electrode may comprise, as a negative electrode active material, any one selected from: lithium metal oxide; carbon such as non-graphitizable carbon or graphite-based carbon; metal composite oxides, such as $Li_xFe_2O_3$ ($0\leq x\leq 1$), $Li_xWO_2$ ($0\leq x\leq 1$), $Sn_xMe_{1-x}Me'_yO_z$ (Me:Mn, Fe, Pb, Ge; Me':Al, B, P, Si, elements of Group 1, 2 or 3 in the Periodic Table, halogen; $0<x\leq 1$; $1\leq y\leq 3$; $1\leq z\leq 8$);

lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may comprise stainless steel, copper, aluminum, nickel, titanium, baked carbon, aluminum or stainless steel surface-treated with carbon, nickel, titanium or silver, or the like.

The binder resin used for the electrodes may be a polymer used currently for electrodes in the art. Non-limiting examples of the binder resin comprise, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery. According to the present disclosure, the electrolyte is a salt having a structure of $A^+B^-$, wherein $A^+$ comprises an alkali metal cation such as $Li^+$, $Na^+$, $K^+$ or a combination thereof, and $B^-$ comprises an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Further, the present disclosure provides a battery module which comprises a battery comprising the electrode assembly as a unit cell, a battery pack comprising the battery module, and a device comprising the battery pack as an electric power source. Particular examples of the device comprise, but are not limited to: power tools driven by the power of an electric motor; electric cars, comprising electric vehicles (EV), hybrid electric vehicles (HEV), plug-in hybrid electric vehicles (PHEV), or the like; electric two-wheeled vehicles, comprising E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Manufacture of Separator

Binder resin compositions were prepared according to the compositions as shown in the following Table 1. Acetone and ethanol were mixed at a weight ratio of 4:1, and each of the binder resin compositions according to Examples and Comparative Examples was introduced thereto to prepare a polymer solution (solid content 5 wt %). Then, $Al_2O_3$ (Japanese Light Metal, LS235) was introduced to the polymer solution and dispersed therein by using a ball mill to prepare slurry for a porous coating layer. The slurry was coated on a porous substrate (B12PA1 available from Toray) through a dip coating process and humidified phase separation was induced under a relative humidity (RH) of 40%. In this manner, separators were obtained.

TABLE 1

| | Inorganic particles $Al_2O_3$ (wt %) | PVDF (wt %) | PVP (wt %) | PVP-co-PVAc (wt %) | PVP-co-PVAc Monomer ratio (wt %) | PVP-co-PVAc Molecular weight (Mw, g/mol) |
|---|---|---|---|---|---|---|
| Comp. Ex. 1 | 0 | 50 | 15 | 35 | 40:60 | 1,000,000 |
| Comp. Ex. 2 | 90 | 0 | 3 | 7 | 40:60 | 1,000,000 |
| Comp. Ex. 3 | 80 | 10 | 0 | 10 | 40:60 | 1,000,000 |
| Comp. Ex. 4 | 80 | 10 | 10 | 0 | 0 | 0 |
| Ex. 1 | 80 | 10 | 3 | 7 | 40:60 | 800,000 |
| Ex. 2 | 80 | 10 | 3 | 7 | 40:60 | 1,000,000 |
| Comp. Ex. 5 | 80 | 10 | 3 | 7 | 40:60 | 50,000 |
| Comp. Ex. 6 | 80 | 10 | 3 | 7 | 40:60 | 300,000 |
| Ex. 3 | 80 | 10 | 3 | 7 | 50:50 | 1,000,000 |
| Ex. 4 | 80 | 10 | 3 | 7 | 20:80 | 1,000,000 |
| Comp. Ex. 7 | 80 | 10 | 3 | 7 | 10:90 | 1,000,000 |
| Comp. Ex. 8 | 80 | 10 | 3 | 7 | 80:20 | 1,000,000 |
| Ex. 5 | 82 | 10 | 3 | 5 | 40:60 | 1,000,000 |
| Ex. 6 | 77 | 10 | 3 | 10 | 40:60 | 1,000,000 |
| Comp. Ex. 9 | 85 | 10 | 3 | 2 | 40:60 | 1,000,000 |
| Comp. Ex. 10 | 72 | 10 | 3 | 15 | 40:60 | 1,000,000 |

TABLE 2

| | Coating layer thickness (μm) | Loading amount (g/cm$^2$) | Air permeability (s/100 cc) | Heat shrinkage (%, 150° C.) (TD/MD) | Adhesion to electrode (gf/25 mm) |
|---|---|---|---|---|---|
| Comp. Ex. 1 | Both surfaces 4 μm/4 μm | 7.3 | 33,590 | 0/0 | 231 |

TABLE 2-continued

| | Coating layer thickness (μm) | Loading amount (g/cm²) | Air permeability (s/100 cc) | Heat shrinkage (%, 150° C.) (TD/MD) | Adhesion to electrode (gf/25 mm) |
|---|---|---|---|---|---|
| Comp. Ex. 2 | Both surfaces 4 μm/4 μm | 14.5 | 19,736 | 0.4/0 | 7 |
| Comp. Ex. 3 | Both surfaces 4 μm/4 μm | 14.2 | 943 | 8.0/5.0 | 45 |
| Comp. Ex. 4 | Both surfaces 4 μm/4 μm | 14.0 | 1,532 | 2.0/1.0 | 28 |
| Ex. 1 | Both surfaces 4 μm/4 μm | 13.4 | 832 | 2.1/1.9 | 89 |
| Ex. 2 | Both surfaces 4 μm/4 μm | 13.5 | 1,150 | 1.0/0.7 | 70 |
| Comp. Ex. 5 | Both surfaces 4 μm/4 μm | 12.4 | 432 | 19.0/16.0 | 56 |
| Comp. Ex. 6 | Both surfaces 4 μm/4 μm | 12.8 | 512 | 15.0/10.0 | 88 |
| Ex. 3 | Both surfaces 4 μm/4 μm | 13.0 | 870 | 1.0/1.0 | 65 |
| Ex. 4 | Both surfaces 4 μm/4 μm | 13.4 | 932 | 5.0/3.6 | 90 |
| Comp. Ex. 7 | Both surfaces 4 μm/4 μm | 13.5 | 910 | 15.0/11.0 | 120 |
| Comp. Ex. 8 | Both surfaces 4 μm/4 μm | 13.4 | 831 | 1.0/0.7 | 33 |
| Ex. 5 | Both surfaces 4 μm/4 μm | 13.5 | 723 | 4.0/3.0 | 63 |
| Ex. 6 | Both surfaces 4 μm/4 μm | 13.0 | 1,430 | 1.6/1.4 | 85 |
| Comp. Ex. 9 | Both surfaces 4 μm/4 μm | 14.2 | 367 | 12.0/9.0 | 41 |
| Comp. Ex. 10 | Both surfaces 4 μm/4 μm | 12.5 | 12,530 | 0.7/0.4 | 167 |

As can be seen from Table 2, the batteries of Examples 1-6 according to the present disclosure show better results in terms of air permeability, heat shrinkage and adhesion, as compared to Comparative Examples 1-10.

Test Methods

1) Loading Amount

The loading amount is the weight of a mixture containing inorganic particles and each binder resin composition per unit area of the porous coating layers coated on both surfaces of the porous substrate.

2) Air Permeability

The air permeability was determined as time (sec) required for 100 cc of air to permeate through a separator under a constant pressure (0.05 MPa) by using an air permeability tester (EG01-55-1MR available from Asahi Seiko). The air permeability was measured at the three points of the left side/center/right side of each sample and was recorded as the average value.

When the air permeability is 2,000 s/100 cc or more, it may cause degradation of the output and cycle characteristics of a battery.

3) Heat Shrinkage

The heat shrinkage was calculated by cutting each of the separators according to Examples and Comparative Examples into a size of 5 cm×5 cm, allowing each separator to stand at 150° C. for 30 minutes, and then calculating the shrinkage in each of the TD and MD according to the following Formula. When a separator has a shrinkage in each direction of 5% or less, it can be said that the separator has excellent heat resistance.

Heat Shrinkage (%)=[(Length before shrinking−Length after shrinking)/(Length before shrinking)]×100

4) Adhesion to Electrode

Each of the separators according to Examples and Comparative Examples was cut into a size of 100 mm (length)×25 mm (width), and laminated with a negative electrode through hot pressing under the conditions of 60° C., 6.5 MPa and 1 second. Then, the separator was peeled at an angle of 180° at a rate of 300 mm/min by using a UTM instrument (Instron), and the peel strength was measured at this time. It is preferred that a separator has an adhesion to an electrode of 50 g/25 mm or more.

The negative electrode was obtained as follows. Negative electrode slurry was prepared by mixing 66.1 wt % of artificial graphite (coal tar pitch), 26.9 wt % of natural graphite, 1.5 wt % of SiO, 1.5 wt % of carbon black, 3 wt % of SBR as a binder and 1 wt % of CMC. The slurry was applied to copper foil at a loading amount of 495 mg/25 cm², dried in a vacuum oven at 100° C. for 10 hours or more, and then roll pressing was carried out to obtain a negative electrode (total thickness 159.6 pin).

What is claimed is:

1. A separator for an electrochemical device, comprising:
a porous polymer substrate; and
a porous coating layer formed on at least one surface of the porous polymer substrate,
wherein the porous coating layer comprises inorganic particles and a binder resin composition consisting of a PVDF-based polymer, PVP and PVP-co-PVAc,
wherein based on 100 wt % of the combined weight of the binder resin composition with the inorganic particles in the porous coating layer, the binder resin composition is present in an amount of 10-30 wt %, the PVDF-based polymer is 5-20 wt %, the PVP is 1-3 wt % and the PVP-co-PVAc is 5-10 wt %,
wherein the PVP-co-PVAc has a molecular weight (Mw) of from 800,000 g/mol to 1,000,000 g/mol and, the content of the PVAc polymerization units in PVP-co-PVAc is 50-80 wt % based on the PVP-co-PVAc.

2. The separator for the electrochemical device according to claim 1, wherein the PVDF-based polymer comprises vinylidene fluoride homopolymer, PVDF-HFP, PVDF-CTFE, or two or more of them.

3. The separator for the electrochemical device according to claim 1, wherein the inorganic particles comprise at least one of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, SiC, or $TiO_2$.

4. An electrochemical device comprising:
a positive electrode;
a negative electrode; and
a separator interposed between the positive electrode and the negative electrode,
wherein the separator is the separator for the electrochemical device as defined in claim 1.

* * * * *